US012809089B2

(12) United States Patent
Szoke

(10) Patent No.: US 12,809,089 B2
(45) Date of Patent: Nov. 24, 2026

(54) SiN-BASED CONTRA-DIRECTIONAL FILTER FOR WDM SYSTEMS

(71) Applicant: Quintessent Inc., Goleta, CA (US)

(72) Inventor: Szilard Szoke, Los Angeles, CA (US)

(73) Assignee: Quintessent Inc., Goleta, CA (US)

( * ) Notice: Subject to any disclaimer, the term of this patent is extended or adjusted under 35 U.S.C. 154(b) by 302 days.

(21) Appl. No.: 18/414,727

(22) Filed: Jan. 17, 2024

(65) Prior Publication Data

US 2024/0241320 A1 Jul. 18, 2024

Related U.S. Application Data

(60) Provisional application No. 63/439,418, filed on Jan. 17, 2023.

(51) Int. Cl.
*G02B 6/293* (2006.01)
*G02B 6/12* (2006.01)
*G02B 6/122* (2006.01)

(52) U.S. Cl.
CPC ..... *G02B 6/29325* (2013.01); *G02B 6/12007* (2013.01); *G02B 6/1225* (2013.01); *G02B 6/29382* (2013.01)

(58) Field of Classification Search
CPC ............ G02B 6/29325; G02B 6/12007; G02B 6/29382; G02B 6/1225; G02B 2006/12164

(Continued)

(56) References Cited

U.S. PATENT DOCUMENTS 5,805,751 A * 9/1998 Kewitsch ........... G02B 6/02138 385/48
10,088,630 B2 * 10/2018 Shi ......................... G02B 6/124
(Continued)

FOREIGN PATENT DOCUMENTS

CN 106772801 A * 5/2017 ............. G02B 6/125
CN 110618486 A * 12/2019 ............... G02B 6/10
(Continued)

OTHER PUBLICATIONS

"Ultra-Compact Broadband 2 ×2 3 dB Power Splitter Using a Subwavelength-Grating Assisted Asymmetric Directional Coupler" by Ye et al., Journal of Lightwave Technology, vol. 38, No. 8, pp. 2370-2375 (Year: 2020).*
(Continued)

*Primary Examiner* — Robert Tavlykaev
(74) *Attorney, Agent, or Firm* — Kaplan Breyer Schwarz LLP

(57) ABSTRACT

The teachings of the present disclosure enable contra-DC wavelength filters having improved filtering performance as compared to the prior art by including transition taper regions between a bus waveguide and a central mirror region, where the taper regions provide significantly longer interaction regions between the bus-waveguide and a grating element that defines the mirror region. In addition, the taper regions adiabatically transition a light signal between weakly coupled regimes to a strongly coupled region in the mirror region. Furthermore, contra-DC filters disclosed herein are made from silicon nitride, which enables their practical fabrication using conventional process nodes in standard silicon foundries. Such contra-DC filters provide a slow increase in coupling strength as a light signal enters the filter, which results in higher sidelobe suppression and lower insertion loss as compared to prior-art WDM filters.

24 Claims, 4 Drawing Sheets

(58) Field of Classification Search
USPC .............................. 385/9, 18, 27, 28, 30, 42
See application file for complete search history.

(56) References Cited

U.S. PATENT DOCUMENTS

| | | | | |
|---|---|---|---|---|
| 2006/0039647 A1* | 2/2006 | Ling | G02B 6/12007 385/24 |
| 2015/0104130 A1* | 4/2015 | Anderson | G02B 6/1228 385/28 |
| 2021/0294035 A1* | 9/2021 | Bian | G02B 6/26 |
| 2022/0326441 A1* | 10/2022 | Sapra | G02B 6/124 |

FOREIGN PATENT DOCUMENTS

| | | | | |
|---|---|---|---|---|
| CN | 112379485 A | * 2/2021 | G02B 6/293 |
| CN | 113534564 A | * 10/2021 | G02B 6/29 |
| CN | 115308846 A | * 11/2022 | G02B 6/293 |
| CN | 116400460 A | * 7/2023 | G02B 6/122 |
| WO | WO 2022/256904 A1 | * 12/2022 | G02B 6/26 |

OTHER PUBLICATIONS

"Silicon photonic contradirectional couplers using subwavelength grating waveguides" by Naghdi et al., Optics Express, vol. 24, No. 20, pp. 23429-23438 (Year: 2016).*

"Flat-Top CWDM (De)Multiplexers Based on Contra-Directional Couplers With Subwavelength Gratings" by Chen et al, IEEE Photonics Technology Letters, vol. 31, No. 24, pp. 2003-2006 (Year: 2019).*

Boyu Liu, et al., "Silicon photonic bandpass filter based on apodized subwavelength grating with high suppression ratio and short coupling length," Optics Express, May 15, 2017, Optical Society of America, pp. 11359-11364, vol. 25, No. 10, https://doi.org/10.1364/OE.25.011359.

Dominique Charron, et al., "Subwavelength-grating contradirectional couplers for large stopband filters," Optics Letters, Feb. 15, 2018, pp. 895-898, vol. 43, No. 4, https://doi.org/10.1364/OL.43.000895.

Han Yun, et al., "Broadband flat-top SOI add-drop filters using apodized sub-wavelength grating contradirectional couplers," Optics Letters, Oct. 15, 2019, pp. 4929-4932, vol. 44, No. 20, https://doi.org/10.1364.OL.44.004929.

Wei Shi, et al., "Ultra-compact, flat-top demultiplexer using anti-reflection contra-directional couplers for CWDM networks on silicon", Optics Express, Mar. 11, 2013, Optical Society of America, pp. 6733-6738, vol. 21, No. 6.

* cited by examiner

Sectional view through a-a

Sectional view through a-a

SiN-BASED CONTRA-DIRECTIONAL FILTER FOR WDM SYSTEMS

CROSS REFERENCE TO RELATED APPLICATIONS

This case claims priority of U.S. Provisional Patent Application Ser. No. 63/439,418, filed Jan. 17, 2023, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to photonic elements in general, and, more particularly, to integrated-photonics-based wavelength filters for wavelength-division-multiplexed systems.

BACKGROUND

Wavelength Division Multiplexed (WDM) systems have found widespread use in many applications, such as optical communications systems and sub-systems, WDM-based networking, optical input/output for high-performance integrated circuits, LiDAR, sensing, and the like.

A WDM system combines ("multiplexes") many individual wavelength signals to form a broadband signal that is transmitted through at least a portion of the system. As a result, a WDM system can carry a tremendous amount of information, since its aggregate information-carrying capacity is determined by the data rate of its constituent wavelength signals and their total number.

Each wavelength signal has a unique center wavelength and the wavelength signals are separated by a wavelength spacing, the sum total of which defines the total spectral range (i.e., spectral window of operation) of the WDM system. Over the years, an ever-increasing demand for information-carrying capacity has led to a marked increase in the number of wavelength signals, such that modern WDM systems require a very wide spectral range of operation.

At various points in a WDM system, it is desirable to split one or more individual wavelength signals out of a broadband signal ("demultiplexed") to, for example, send it to a different destination or perform an operation on only that wavelength signal. For most applications, demultiplexing must be performed without significant degradation of the separated wavelength signal(s) or those wavelength signals that simply pass through the splitting region. For broadband signals comprising large numbers of wavelength signals and a commensurate spectral window of operation, this has proven challenging.

Furthermore, more recently, photonic integrated circuits (PICs) comprising complete WDM systems and/or WDM sub-systems disposed on a single substrate. Such PICs are desirable because they offer the potential for reducing system cost/complexity eliminating packaging requirements, alignment issues during assembly and use, reduce overall system size, etc. However, although PICs based on single-mode waveguide designs theoretically can have a wide spectral window of operation suitable for use in modern WDM systems, in practice, their spectral range has been limited by the material properties of the waveguide materials used, system architecture, the functional bandwidth of passive photonic circuit elements, and the ultimate performance of detectors required to measure any signals upon which it operates.

As a result, in some applications, it has been necessary to use "coarse WDM" techniques to demultiplex a wide-spectral-range broadband signal by splitting it into multiple narrower-spectral-range signals (referred to as "wavelength channels"), where each wavelength channel includes multiple wavelength signals. "Dense WDM" techniques can then be used to separate these wavelength channels into their constituent narrow-bandwidth wavelength signals. The finer and more compact this fragmentation can be performed, the more utilizable wavelengths can be incorporated into a PIC-based WDM system, thereby increasing its aggregate information-carrying capacity.

Wavelength multiplexing and demultiplexing is commonly performed using an add-drop filter. Conventional add-drop filters have been based on a variety of photonic devices, such as Bragg gratings, microring resonators, and arrayed waveguide gratings (AWG), among others. The choice of WDM-filter device is generally limited by considerations such as filtering performance (e.g., wavelength-channel crosstalk, insertion loss, spectral bandwidth, etc.), footprint (i.e., in-plane lateral and vertical dimensions), and scalability.

Unfortunately, most prior-art WDM-filter designs suffer from deficiencies in their optical-filter spectrum. For example, many prior-art WDM filters display a rippling behavior that unevenly, and negatively, affects the wavelength signals upon which they operate, which distorts the data they carry. In addition, many common conventional devices exhibit significant insertion loss, which is particularly undesirable in large-scale PICs that can include many hundreds of elements. In such systems, the loss incurred per component can cause the total loss to scale sharply, thereby placing undesirable requirements on the total optical power budget for the PIC.

Examples of devices having reasonable optical filtering with regard to line shape, bandwidth, insertion loss, and crosstalk have been demonstrated; however, such prior-art devices require very large footprints, which makes them difficult to scale. In addition, there is a need for thermal stabilization of these devices, resulting in an electrical power budget that increases drastically as the number of wavelengths increases.

Furthermore, while conventional WDM filters are feasible for use in many optical communications bands (e.g., C band, L band, etc.), for those bands comprising shorter wavelengths, their reliable fabrication in a conventional foundry can be difficult, if not impossible, due to the extremely small size of their features. This is particularly true for WDM filters operating in the O-band, which has become of critical importance for passive-optical networks (PONs) and optical ethernet, among other applications.

One WDM filter that has garnered significant interest of late is the contra-directional coupler (contra-DC) filter. Examples of prior-art contra-DC filters are described by Liu, et al., in "Silicon photonic bandpass filter based on apodized subwavelength grating with high suppression ratio and short coupling length," *Optics Express*, Vol. 25, pp. 11359-11364 (2017), Charron, et al., "Subwavelength-grating contradirectional couplers for large stopband filters," *Opt. Lett.*, Vol. 43, pp. 895-898 (2018); and Yun, et al., "Broadband flat-top SOI add-drop filters using apodized sub-wavelength grating contradirectional couplers," *Opt. Lett.*, Vol. 44, pp. 4929-4932 (2019).

However, prior-art contra-DC filters have several disadvantages for many applications. First, prior-art contra-DC filters demonstrated to date have employed silicon waveguides disposed on silicon substrate and, importantly, are designed for operation only in the C-band (i.e., wavelengths from 1530 nm to 1565 nm). The relatively long wavelengths within this window of operation enable the use of larger grating features (e.g., grating elements and gaps on the order of a few hundred nanometers), which is large enough to enable fabrication using conventional silicon foundry processes.

Second, contra-DC filters demonstrated thus far require a relatively short device length, due to limitations in the feasibility of simulating such large structures, as well as in their fabrication.

A practical, low-cost integrated-photonic wavelength filter that can be designed and fabricated such that it is suitable for use in range of communications bands would be an important advance in the state of the art.

SUMMARY

The present disclosure is directed toward practical contra-DC filters for use in WDM systems. Embodiments in accordance with the present disclosure are particularly well suited for use in applications such as WDM optical communications systems, LIDAR, sensing, and the like.

An advance over the prior art is realized by enabling improved filtering performance through the use of substantially optimized transition tapers on either side of a central grating element, as well as significantly longer interaction regions between the bus-waveguide and the grating element. Furthermore, contra-DC filters in accordance with the present disclosure are based on silicon nitride waveguides, rather than silicon waveguides, which enables their fabrication using conventional silicon-foundry processes even when designed for operation in a communications band other than the C band. Still further, the bus-waveguide and grating element of contra-DC filters in accordance with the present disclosure are arranged to define a central mirror region located between two taper regions, where the central mirror region is a strongly coupled region and each taper region adiabatically transitions between the strongly coupled region of the mirror region to weakly coupled regions outside the footprint of the filter. This gives rise to a slow change in the coupling strength along the lengths of the taper regions, which enables high sidelobe suppression and low insertion loss, thereby enabling improved performance relative to prior-art WDM filters.

An illustrative embodiment in accordance with the present disclosure is a contra-DC filter configured for operation in the O band, which includes wavelengths from approximately 1260 nm to approximately 1360 nm. The contra-DC filter comprises a bus waveguide and an adjacent grating element, which are collectively configured to define a mirror region located between two symmetric taper regions. Both the bus waveguide and grating element are formed entirely in silicon nitride with a silicon oxide cladding. In some embodiments, a grating element is configured for coarse-WDM filtering. In some embodiments, a contra-DC filter is configured for operation in a different optical communications band (e.g., E band, S band, C band, L band, etc.).

The bus waveguide is a single-mode waveguide designed for operation in the desired optical communications band. The bus waveguide includes a pair of S-bends such that, well outside of the mirror region, the bus waveguide is separated from the grating element by a distance sufficient to mitigate optical coupling between them. In some embodiments, the bus waveguide incorporates at least one bend other than an S-bend.

The grating element includes a conventional single-mode waveguide that transitions into a photonic crystal located in the mirror region. In the taper regions, the grating is configured to transition between the grating structure in the mirror region to a rectangular single-mode waveguide outside of the filter footprint. The transition regions are also designed to suppress filter sidelobes and enable an adiabatic transition of the grating element between no/weak interaction with the bus waveguide and strong interaction with the bus waveguide.

In the mirror region, the gap between the bus waveguide and grating element is sized to facilitate good optical coupling between them, as well as widen the effective stopband of the filter.

An embodiment in accordance with the present disclosure is a contra-directional coupler (contra-DC) filter disposed on a substrate, the contra-DC filter comprising: a bus waveguide having a first core comprising silicon nitride; and a grating element that includes a grating waveguide having a second core and a first plurality of teeth that is optically coupled with the grating waveguide, the second core and the teeth of the first plurality thereof comprising silicon nitride, and wherein the grating element has a first length and the grating waveguide extends along the entire first length; wherein the bus waveguide and grating element are configured to define first and second taper regions and a mirror region located between the first and second taper regions, the mirror region being a strongly coupled region for a first light signal, the grating waveguide being included in each of the first and second taper regions and the mirror region; wherein the first taper region includes a first adiabatic directional coupler for adiabatically transitioning the first light signal between a first weak coupling region and the mirror region; and wherein the second taper region includes a second adiabatic directional coupler for adiabatically transitioning a second light signal between the mirror region and a second weak coupling region, the second light signal including at least a first portion of the first light signal.

Another embodiment in accordance with the present disclosure is a contra-directional coupler (contra-DC) filter disposed on a substrate, the contra-DC filter comprising: a bus waveguide having a first core, the bus waveguide including (a) an input port for receiving a first light signal comprising a first plurality of wavelength signals and (b) an output port for providing a second light signal that includes at least one wavelength signal of the first plurality thereof; and a grating element comprising a first plurality of teeth and a grating waveguide having a second core, wherein the grating waveguide includes a drop port for providing a third light signal that includes at least one wavelength signal of the first plurality thereof, and wherein the grating element has a first length and the grating waveguide extends along the entire first length; wherein each of the first and second cores and the teeth of the first plurality thereof comprises silicon nitride; and wherein the bus waveguide and grating element are arranged such that, for the first plurality of wavelength signals, they define: (i) a strongly coupled region, the strongly coupled region defining a mirror region that includes a first portion of the bus waveguide and a first portion of the grating element, wherein the mirror region is configured to redirect the third light signal to the drop port; (ii) a first taper region configured to adiabatically transition between the strongly coupled region and a first weakly coupled region that is outside a footprint of the contra-DC filter; and (iii) a second taper region configured to adiabatically transition between the strongly coupled region and a second weakly coupled region that is outside the footprint.

Yet another embodiment in accordance with the present disclosure is a method for dropping at least one wavelength signal from a first light signal that includes a first plurality of wavelength signals, the method comprising: providing a contra-DC filter disposed on a substrate, the contra-DC filter including: (i) a bus waveguide having a first core, the bus waveguide including an input port and an output port; and (ii) a grating element that includes a grating waveguide having a second core and a first plurality of teeth that is optically coupled with the grating waveguide, the second core including a drop port; wherein the first core, the second core, and the teeth of the first plurality thereof comprise silicon nitride; wherein the bus waveguide and grating element collectively define first and second taper regions and a mirror region located between the first and second taper regions; and wherein the grating element has a first length and the grating waveguide extends along the entire first length; adiabatically transitioning the first light signal from a first weakly coupled region at the input port to a strongly coupled region at the mirror region; at the mirror region, distributing the first light signal into second and third light signals, each of the second and third light signals including at least one wavelength signal of the first plurality thereof; adiabatically transitioning the second light signal from the strongly coupled region to a second weakly coupled region at the output port and providing the second light signal at the output port; and adiabatically transitioning the third light signal from the strongly coupled region to the first weakly coupled region and providing the third light signal at the drop port.

DETAILED DESCRIPTION

Figure 1:
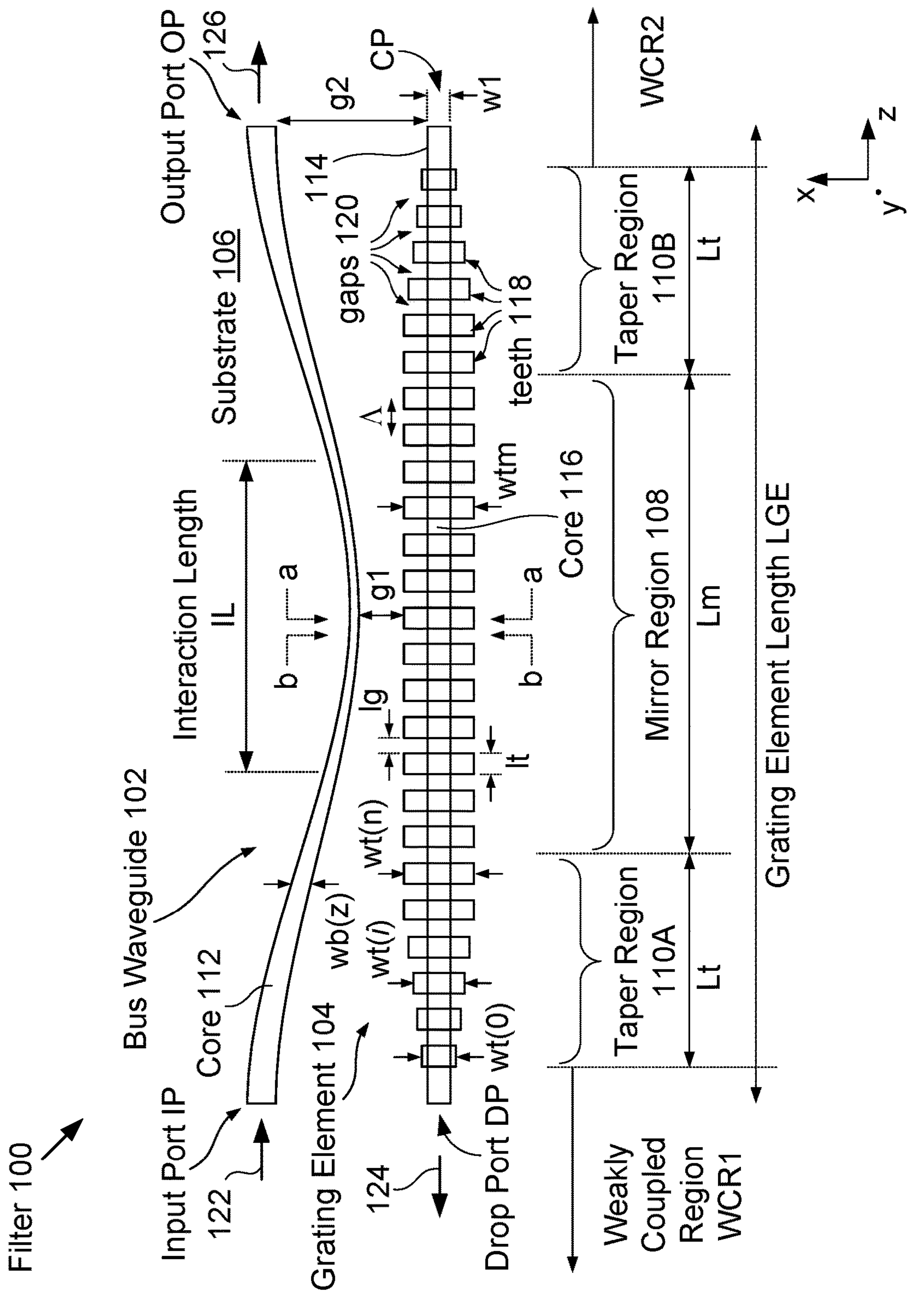
FIG. 1 depicts a schematic drawing of a plan view of an illustrative embodiment of a contra-DC filter in accordance with the present disclosure

The following terms are defined for use in this Specification, including the appended claims:

Coupling is defined via a mode coupling coefficient, $\kappa_{\rho\sigma}$, which is evaluated for a pair of parallel waveguides ($\rho$ and $\sigma$) as:

$$\kappa_{\rho,\sigma} = \frac{\omega\varepsilon_0 \iint_{-\infty}^{\infty} (\varepsilon_r - \varepsilon_{r,\sigma}) \vec{E}_\rho^* \cdot \vec{E}_\sigma dxdy}{\iint_{-\infty}^{\infty} \hat{z} \cdot \left( \vec{E}_\rho^* \times \vec{H}_\rho + \vec{E}_\rho \times \vec{H}_\rho^* \right) dxdy}$$

where $\omega$ is the angular frequency of the wavelength at which coupling is evaluated, $\varepsilon_0$ is the vacuum permittivity, $\varepsilon_\rho$ is the dielectric function which contains both waveguides, and $\varepsilon_{\rho,\sigma}$ is the dielectric function which only contains waveguide $\sigma$. $\vec{E}$ and $\vec{H}$ are the electric and magnetic field vectors, with the field vector subscripts denoting which mode ($\rho$ and $\sigma$) the field belongs to. Field vectors with * superscripts are the complex conjugates. The coefficient quantifies how well power is transferred from one waveguide to the other due to the presence of supermodes that result from the coupled behavior of the closely spaced waveguides. The integral is in general unbounded and therefore requires appropriate normalization. When normalized, the coefficient allows for definition of different coupling regimes.

A Strongly coupled region is defined as a region in which, for a light signal of interest, the mode coupling coefficient between two optical elements is $0.5 << \kappa_{\rho\sigma} \leq 1$. Examples of strongly coupled regions include: a region in which a light signal of interest is optically coupled between two waveguides with a mode coupling coefficient of $0.5 << \kappa_{\rho\sigma} \leq 1$, a region in which a light signal of interest is optically coupled between a waveguide and a grating element with a mode coupling coefficient $0.5 << \kappa_{\rho\sigma} \leq 1$ and the like;

A Weakly coupled region is defined as a region in which, for a light signal of interest, the mode coupling coefficient between two optical elements is $0 \leq \kappa_{\rho\sigma} << 0.5$ In some cases, there is substantially no optical coupling of a light signal of interest between two elements in a weakly coupled region. Examples of weakly coupled regions include: a region in which a light signal of interest is not optically coupled between two waveguides, or is optically coupled between them with a mode coupling coefficient of $0 \leq \kappa_{\rho\sigma} << 0.5$, a region in which a light signal of interest is not optically coupled between a waveguide and a grating element, or is optically coupled between them with a mode coupling coefficient of $0 \leq \kappa_{\rho\sigma} << 0.5$ and the like.

As noted above, prior-art contra-DC filters have significant drawbacks that make them less attractive for use—particularly, in large-scale WDM systems designed for operation at wavelengths shorter than those included in the C-band. Many of these drawbacks arise from a reliance on silicon waveguides. As will be apparent to one skilled in the art, after reading this Specification, the features sizes of a silicon-based contra-DC filter become too small for reliable fabrication when it is designed for operation at wavelengths shorter than those included in the C band.

In contrast, contra-DC filters in accordance with the present disclosure are based on silicon nitride (SiN) waveguides. Because the refractive index of SiN is approximately ½ that of silicon, the use of SiN waveguides enables the elements of a contra-DC filter to be significantly larger than comparable elements formed in a silicon waveguide. As a result, the fabrication of a silicon-nitride-based contra-DC filter is easier than the fabrication of a silicon-based contra-DC filter. This, in turn, makes it feasible to reliably fabricate a contra-DC filter designed for operation at wavelengths as short as those included in the O-band using conventional silicon foundry process nodes. As a result, the teachings herein enable large-scale integration of contra-DC filters in accordance with the present disclosure in a PIC designed for operation in nearly any commonly used optical communications band.

Furthermore, the underlying design of a contra-DC filter in accordance with the present disclosure enables a higher level of optimization than can be realized in prior-art filters, while maintaining a tractable number of parameters that govern the device. This enables the design of even large numbers of filter elements that can be tailored to specific wavelength channels, while displaying superior optical performance and smaller effective footprints in comparison to conventional WDM systems. In some embodiments, these specific wavelength channels are aligned with the standard CWDM ITU grid. In some embodiments, the wavelength signals within at least one wavelength channel are aligned with the standard DWDM ITU grid.

Contra-DC filters in accordance with the present disclosure:

i. employ SiN-based waveguides, which enables fabrication of devices suitable for operation in nearly any optical communications band in a silicon foundry with standard high-volume processing tools and nodes; or
ii. enable passive stabilization of the filter spectrum due to a lower thermo-optic coefficient for SiN, as compared to Si-based devices; or
iii. have an achievable filter bandwidth that is greater than that achievable with other device architectures; or
iv. have a sharp filter roll-off that enables low crosstalk between wavelength channels, as well as a denser wavelength-channel layout configuration; or
v. have a flat-top (ripple-free) filter function having substantially equal loss for all wavelength signals within a wavelength channel; or
vi. have lower overall insertion loss than prior-art device architectures; or
vii. have a significantly smaller overall device footprint than prior-art device architectures having similar bandwidth capability; or
viii. enable arbitrary wavelength spacing between wavelength channels in multi-wavelength WDM multiplexers and demultiplexers, thereby providing advantages, such as avoiding four wave mixing, and the like; or
ix. any combination of i, ii, iii, iv, v, vi, vii, and viii.

FIG. 1 depicts a schematic drawing of a plan view of an illustrative embodiment of a contra-DC filter in accordance with the present disclosure. Filter 100 includes bus waveguide 102 and grating element 104.

Bus waveguide 102 and grating element 104 are arranged on silicon substrate 106 to define mirror region 108 and symmetric taper regions 110A and 110B, as well as input port IP, output port OP, and drop port DP. The lateral dimensions of bus waveguide 102 and grating element 104 (i.e., their dimensions in the x- and z-directions, as indicated in FIG. 1) define the footprint of filter 100 on substrate 106.

Bus waveguide 102 includes waveguide core 112, which is made of silicon nitride. Core 112 has width wb(z) and thickness t1. The shape and interaction geometry of bus waveguide 102 are configured to provide good filtering response for the coupled waveguide-grating system. Given the generally good confinement of the fundamental mode in the single-mode optimized geometry, the width, wb(z) of the bus waveguide is modified along the z-axis such that the optical mode carrying light signal 122 is less confined in mirror region 108.

In some embodiments, wb(z) is optimized numerically to provide sufficient delocalization of the optical mode such that there is sufficiently strong interaction between the evanescent tail of the optical mode and grating element 104, while simultaneously satisfying the "primary" Bragg condition discussed below.

It should be noted that the width (and therefore the effective index) of the bus-waveguide in the vicinity of the mirror region is coupled to the effective index of the grating element, which gives rise to several considerations. First, the minimum gap spacing, g1, between the bus waveguide and grating element must be large enough to be reliably fabricated.

Second, the width, wb(z), of bus waveguide 102 within interaction length IL must be narrow enough to enable strong interaction between the evanescent field and grating element 104 for the gap spacing, g1. In other words, the value of wb(z) is selected to support a strongly coupled region within mirror region 108.

Third, the bus waveguide width, wb(z) must be wide enough to mitigate interaction between the optical mode of light signal 122 and underlying substrate 106, since such interaction would give rise to significant optical loss as the light signal passes through filter 100.

Fourth, the bus-waveguide width wb(z) must be selected to ensure that the primary Bragg condition still produces a drop wavelength at the desired position. It should be noted that bus-waveguide width, the grating element geometry, and the bus-waveguide geometry are inter-related with respect to the primary Bragg condition and, therefore, each can be adjusted to affect the desired position of the drop wavelength.

Fifth, the value of gap spacing g1 must be properly selected to realize the desired coupling strength (and thereby the filter drop-spectrum), insertion loss, and sidelobe-suppression.

In some embodiments, a desired width profile, wb(z), for bus waveguide 102 is determined by running numerical simulation sweeps around a nominal target geometry. In some embodiments, a desired width profile, wb(z), for bus waveguide 102 is determined via numerical optimization towards a target spectrum, as discussed below.

It is an aspect of the present disclosure that bus waveguide 102 is tapered such that equal suppression of sidelobes on both sides of the filter band is achieved and such that scattering losses as a result of this transition are mitigated. Equal suppression of sidelobes and, as a result, a more symmetric filter spectrum, is achieved by maintaining phase-matching at the desired drop wavelength throughout the entire length of the device. For embodiments in accordance with the present disclosure, to maintain phase-matching, the propagation constants of the supermodes are adjusted as the device transitions between the weakly coupled and strongly coupled regions via the implemented S-bends (or other transition shape chosen which facilitates and adiabatic coupler). This tapering of bus waveguide 102 is realized such that it enables an adiabatic transformation of the optical mode of light signal 122 from its state at input port IP to its state in mirror region 108. As will be apparent to one skilled in the art, an adiabatic transition is one that occurs without significant optical loss.

Grating element 104 includes grating waveguide 114 and a periodic arrangement of teeth 118 and gaps 120.

Figure 2A:
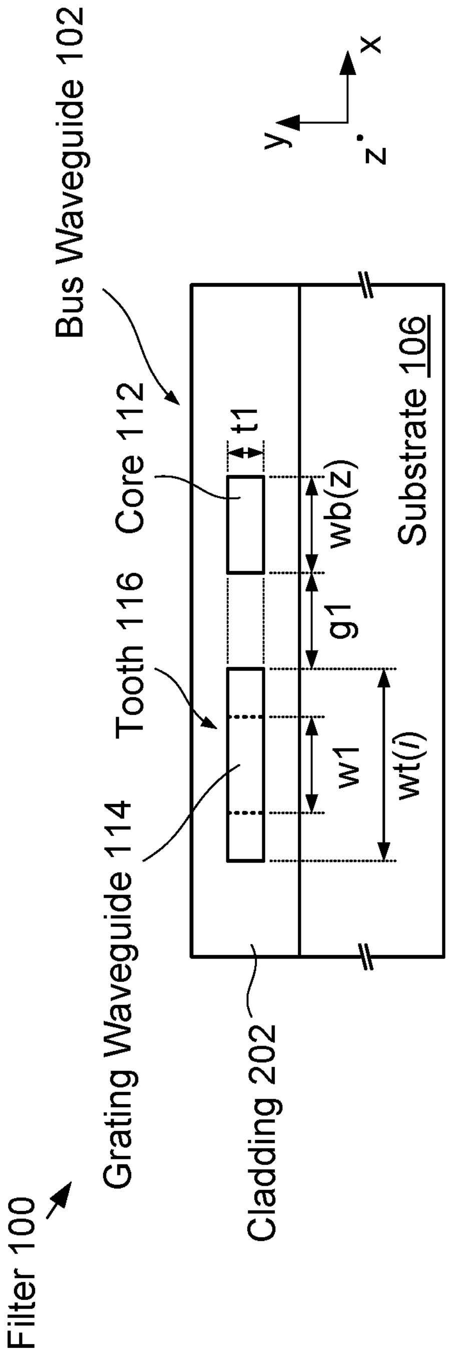
FIGS. 2A-B depict schematic drawings of sectional views of portions of filter 100 that include a tooth and gap, respectively.
Figure 2B:
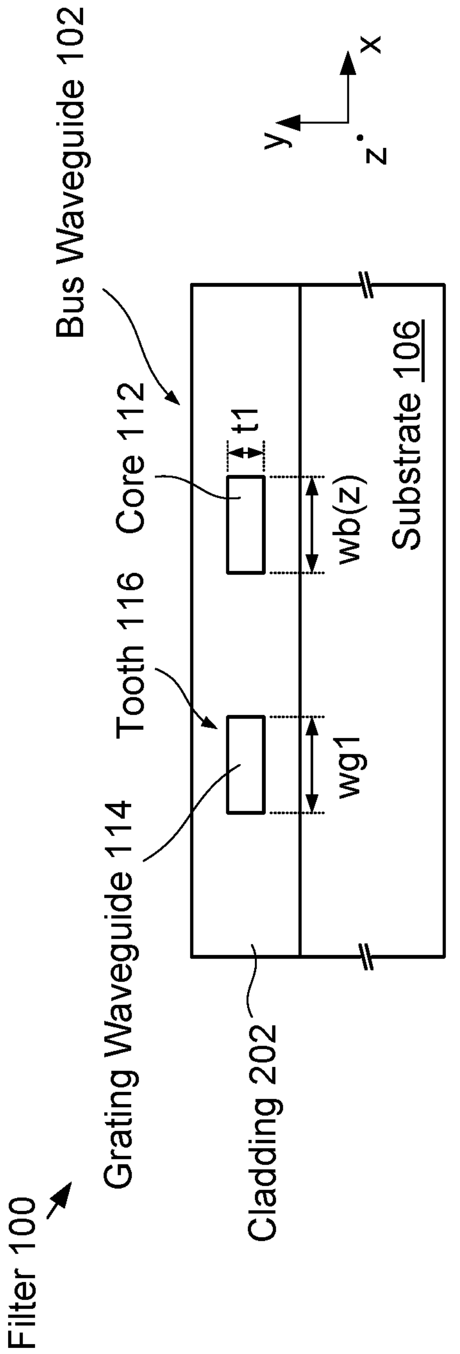

FIGS. 2A-B depict schematic drawings of sectional views of portions of filter 100 that include a tooth and gap, respectively. The sectional views shown in FIGS. 2A and 2B are taken through lines a-a and b-b, respectively, as seen in FIG. 1.

Grating waveguide 114 includes waveguide core 116, which is made of silicon nitride. Grating waveguide 114 runs through the entire length, LGE, of grating element 104 and has uniform width w1. In other words, grating waveguide 114 is continuous through the combined lengths of taper regions 110A-B and mirror region 108. In the depicted example, grating element length LGE defines the total length of filter 100.

Teeth 118 are silicon nitride features that project outward from grating waveguide 114 along the x-direction. Teeth 118 have uniform length, lt, along the z-direction through the entire length of grating element 104. In mirror region 108, teeth 118 also have uniform width, wtm. However, within each taper region, the width of each of tooth, wt(i), for i=0 through n, depends upon the specific location of that tooth within that taper region, as discussed below.

Gaps 120 are regions between teeth 118 that include only grating waveguide 114. Gaps 120 have uniform length, lg, along the z-direction, and uniform width w1 (i.e., the width of grating waveguide 114).

In the depicted example, the ratio of lt to lg is 1:1, such that grating element 104 has a 50% duty cycle; however, any practical duty cycle can be used without departing from the scope of the present disclosure.

The silicon nitride elements of filter 100 are encased in cladding material 202. In the depicted example, cladding material 202 is silicon dioxide; however, any suitable cladding material can be used without departing from the scope of the present disclosure.

It is an aspect of the present disclosure that the use of silicon nitride for the material of the bus waveguide and grating element increases the minimum feature size of a contra-DC filter. As a result, contra-DC filters in accordance with the present disclosure have less stringent resolution requirements and, therefore, can more easily be fabricated using conventional fabrication equipment. In addition, the use of silicon nitride reduces the temperature sensitivity of the structure by approximately an order of magnitude compared to silicon-based structures.

Filter 100 is configured such that the bus waveguide and grating element are characterized by a set of phase-matching conditions, and consequently a set of three distinct Bragg conditions. The phase-matching conditions are defined as:

$$\beta_1(\lambda_{drop}) + \beta_2(\lambda_{drop}) = 2\pi/\Lambda$$

$$2\beta_1(\lambda_{BrWg}) = 2\pi/\Lambda$$

$$2\beta_2(\lambda_{BrGr}) = 2\pi/\Lambda$$

where $\beta_1$ and $\beta_2$ are the propagation constants of the two supermodes which are being utilized in the contra-directional coupling between the two elements, and $\Lambda$ is the period of grating element 104. The corresponding Bragg conditions that follow directly from these, are a "primary" condition associated with the coupled system and two "secondary" conditions associated with the individual elements (bus-waveguide and grating separately). These conditions can be expressed as:

$$\lambda_{drop} = \Lambda(n_{wg} + n_{gr})\text{(primary)}$$

$$\lambda_{BrWg} = 2n_{wg}\Lambda\text{(secondary)}$$

$$\lambda_{BrGr} = 2n_{gr}\Lambda\text{(secondary)}$$

where $\lambda_{drop}$ is the wavelength of drop signal 124, $\lambda_{Brwg}$ is the Bragg wavelength of bus waveguide 102, $\lambda_{BrGr}$ is the Bragg wavelength of grating element 104, $n_{wg}$ is the effective refractive index of bus waveguide 102, $n_{gr}$ is the effective refractive index of grating element 104, and A is the period of grating element 104.

Grating element 104 is configured such that the inclusion of teeth 118 and gaps 120 effectively gives rise to a periodically varying refractive index, with high-index regions in the locations of teeth 118 and low-index regions found in gaps 120. This periodic modulation of the refractive index substantially functions as a photonic crystal that facilitates the formation of a bandgap where a particular wavelength is forbidden to propagate through filter 100 from input port IP to output port OP as a result of the primary Bragg condition (for dense-WDM operation). In some embodiments, a contra-DC filter is configured such that a range of wavelengths is forbidden from propagating through the filter (for coarse-WDM operation).

Grating element 104 includes mirror region 108, which is located between symmetric taper regions 110A and 110B (referred to, collectively, as taper regions 110).

In taper region 110A, grating waveguide 114 transitions from a regular single-mode SiN waveguide into a photonic crystal composed of quasi-rectangular unit cells that defines mirror region 108.

Within mirror region 108, the grating configuration is uniform and serves to reflect a specific wavelength via Bragg reflection. The mirror region is designed by defining the lattice constant of the grating required for the wavelength of interest to satisfy the primary Bragg condition. As noted above, in the depicted example, the duty cycle (i.e. the ratio of the widths of the gaps vs. "teeth") is nominally kept at 50%; however, in some embodiments, adjustments to this parameter enable small shifts in the center wavelength of the dropped wavelength signal (i.e., the center wavelength of the stop band of grating element 104), control of ripple in the filter function, suppression of the magnitude of reflections stemming from the secondary Bragg conditions, and the like.

Within taper regions 110, the functional form of the transition for the inner core and the overlapping grating structure are distinct. Each is modified according to a pair of custom n-th order polynomials that form a piecewise continuous function over the length of the transition. Here, $\zeta$ is not restricted to be an integer value.

$$f(x) \rightarrow \begin{cases} f_L(x,\zeta) = \frac{1}{2}(2x)^{\zeta} & x < 0.5 \\ f_U(x,\zeta) = 1 - \frac{1}{2}(2(1-x))^{\zeta} & x \geq 0.5 \end{cases}$$

The aggregate function consists of a lower, fL, and upper, fU, function respectively. In its unit normalized form, where the function domain x is between 0 and 1, fL defines the function for the interval [0,0.5) and fU for [0.5,1]. Through this piecewise treatment, a single parameter, $\zeta$, can be used to fully define the polynomial shape of the transition. To implement this function into the taper region design, the function's domain and range are simply scaled to match the length and amplitude of the grating element's actual dimensions (lt, lg, wt(i) for i=0 to n, Lt). Given the implicit symmetry of the function's derivative about the line x=0.5, the adiabaticity of the mode transformation along the taper is maintained throughout for an optimal $\zeta$ value. This function is used to define the transition from the regular single-mode waveguide geometry of both teeth 118 and grating waveguide 114. In the case of the grating teeth, the function is sampled at specific points dictated by the grating period, $\Lambda$, and the functional value at these locations is used to define wt(i).

The decoupled treatment of these two elements making up grating element 104 is essential in tailoring the taper region to suppress filter sidelobes sufficiently, thereby reducing the amount of crosstalk between adjacent wavelength channels. In taper regions 110, the length Lt over which the transition happens primarily determines how well the filter sidelobes get suppressed. In mirror region 108, the length Lm primarily affects the strength of the wavelength rejection, as well as the shape of the stopband. A substantially optimal total length of each section can be determined by numerical simulations.

Bus waveguide 102 and grating element 104 are separated by gap spacing g1 at the center of mirror region 108. Typically, the value of g1 is selected to define a strongly coupled region for the bus waveguide and grating element, as well as widen the effective stopband of the device. The width of this stopband, as well as the presence of filter sidelobes is strongly affected by the size of gap spacing g1 and the size of the evanescent part of the optical mode of light signal 122 along interaction length IL. Both of these parameters can be substantially optimized via numerical simulations until the desired filter center wavelength and bandwidth are achieved.

Away from interaction length IL, the separation between the bus waveguide and grating element is gradually increased such that, at the outer ends of taper regions 110, they are separated by relatively larger gap g2, which is selected to substantially mitigate optical coupling between bus waveguide 102 and grating waveguide 114 outside the region of filter 100. In other words, the value of gap g2 is selected to support a weakly coupled (or completely optically decoupled) region outside the region of filter 100.

In the depicted example, in each of taper regions 110A and 110B, the gradual increase in gap size is implemented using a S-bend of bus waveguide 102 to realize an adiabatic directional coupler for the wavelength signals included in light signal 122, where the adiabatic coupler comprises the bus waveguide and grating element, thereby enabling an adiabatic transition of the light signal between a weakly coupled region and the strongly coupled region within mirror region 108. Specifically, taper region 110A enables an adiabatic transition from weakly coupled region WCR1 to strongly coupled mirror region 108, while taper region 110B enables an adiabatic transition from strongly coupled mirror region 108 to weakly coupled region WCR2.

This adiabatic transition further facilitates the suppression of sidelobes, as well as the strength of adjacent reflections originating from the secondary Bragg conditions. Although in the depicted example, bus waveguide 102 includes S-bends, any suitable waveguide shape can be employed without departing from the scope of the present disclosure. Furthermore, in some embodiments, grating waveguide 114 has a shape that includes a suitable bend.

Figure 3:
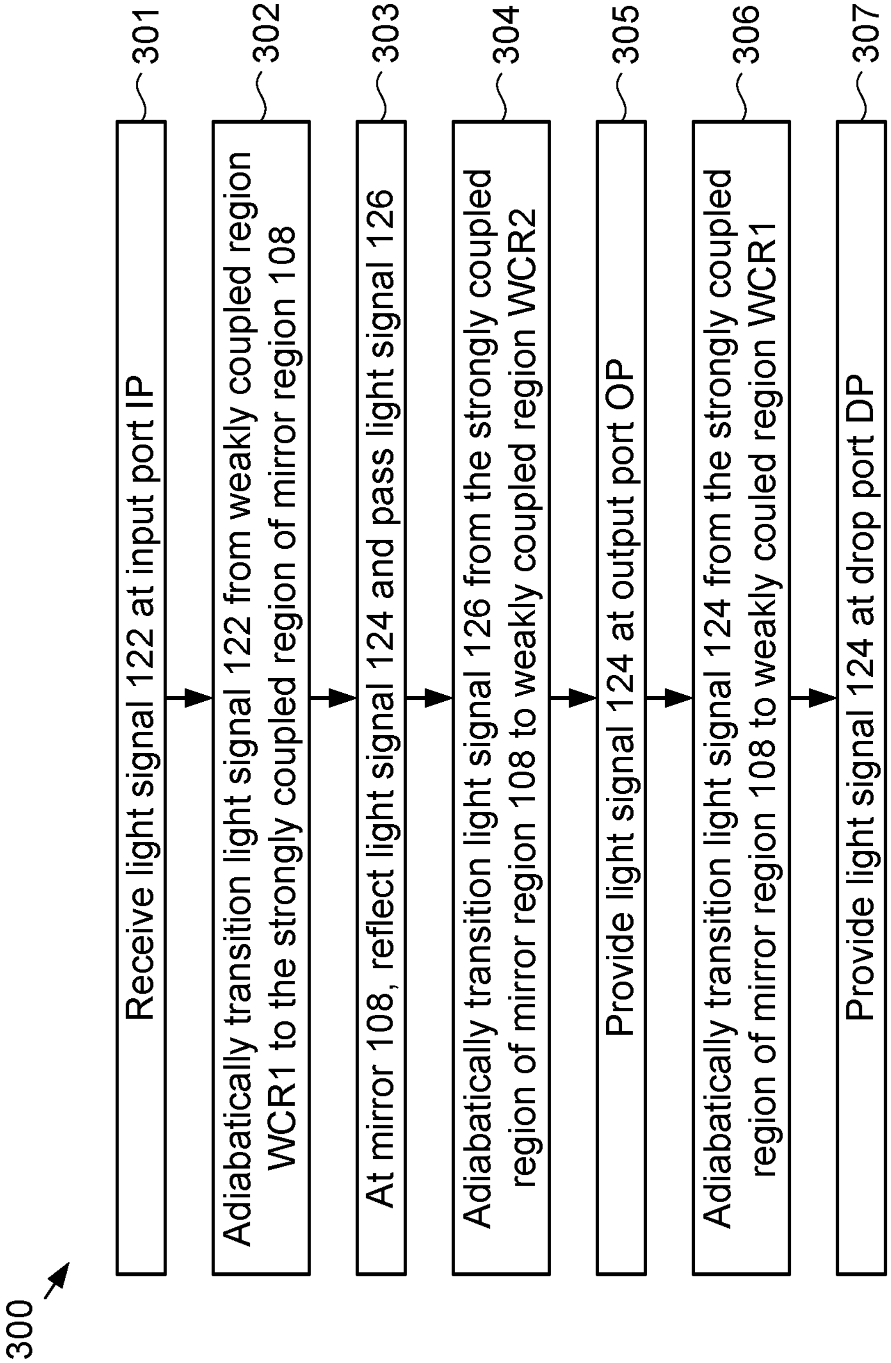
FIG. 3 depicts operations of a method suitable for use in dropping at least one wavelength signal from a WDM signal in accordance with the present disclosure.

FIG. 3 depicts operations of a method suitable for use in dropping at least one wavelength signal from a WDM signal in accordance with the present disclosure. Method 300 is described with continuing reference to FIGS. 1 and 2A-B. Method 300 begins with operation 301, wherein light signal is received at input port IP.

In the depicted example, light signal 122 is a single CWDM wavelength channel that includes multiple DWDM wavelength signals. Once received at input port IP, the light signal is conveyed from input port IP to mirror region 108 by taper region 110A.

At operation 302, the optical coupling of light signal 122 between bus waveguide 102 and grating element 104 slowly increases through taper region 110A and is characterized by an adiabatic transition of the light signal from weakly coupled region WCR1 to the strongly coupled region of mirror 108. This adiabatic transition substantially suppresses the generation of sidelobes and inhibits adjacent reflections originating from the secondary Bragg conditions in filter 100.

At operation 303, at mirror region 108, Bragg reflection gives rise to strong reflection of one wavelength signal within light signal 122. The reflected wavelength signal is redirected toward drop port DP as drop signal 124, while the remainder of light signal 122 continues on toward output port OP as pass signal 126. For the purposes of this Specification, including the appended claims, the term "strong reflection" is defined as a reflection of at least 99% of an incident light signal.

At operation 304, pass signal 126 transitions from the strongly coupled region of mirror 108 to weakly coupled region WCR2, where its optical energy is substantially wholly contained within bus waveguide 102.

As will be apparent to on skilled in the art, after reading this Specification, the "strength" of grating element 104 is primarily determined by the relative difference between high-, and low-refractive index unit cells. The effective index contrast, and the absolute values of the refractive indices themselves determine both the strength and the bandwidth of the reflections in the stopband of filter 100. These parameters also significantly affect the symmetry, strength, and frequency of the sidelobe resonances on the blue and red sides of the stopband. The optimal parameters for the mirror region geometry are linked to the geometry of the single-mode waveguide from which it evolves. Fine optimization of the grating parameters can be performed using simulations until the desired filter behavior is obtained.

At operation 305, pass signal 126 is provided at output port OP.

At operation 306, as it passes through taper region 110A, drop signal 124 transitions from the strongly coupled region of mirror 108 to weakly coupled region WCR1, wherein the optical energy of drop signal 124 is substantially wholly contained within grating waveguide 114.

At operation 307, drop signal 124 is provided at drop port DP.

Although method 300 describes the dropping of a single DWDM wavelength signal from a single CWDM wavelength channel, in some embodiments, a contra-DC filter is configured to drop an entire wavelength channel from a light signal comprising a plurality of wavelength channels. Furthermore, in some embodiments, a WDM system architecture includes one or more contra-DC filters configured to drop a wavelength channel from a light signal comprising a plurality of wavelength channels, as well as one or more contra-DC filters configured to drop an individual wavelength signal from a single wavelength channel.

It should be noted that, in some embodiments, one or more of the ports of a contra-DC filter includes a termination element that is optically lossy (e.g., a beam dump, etc.) to mitigate undesirable back-reflections into input port IP from abrupt waveguide facets.

As will be evident to one skilled in the art, after reading this Specification, there are several distinct differences between contra-DC filters in accordance with the present disclosure and those of the prior art. These differences afford significant advantages over known filters.

For example, secondary reflections often occur in the bus-waveguide and the grating. The Bragg conditions governing the behavior of a contra-DC filter in accordance with the present disclosure, however, provide a degree of freedom in the exact placement of secondary reflections that occur in the bus-waveguide and the grating. While these reflections can be at least partially suppressed by enforcing adiabatic conditions across all geometric transitions in the design of the device, it is difficult, if not impossible, to completely prevent them. For contra-DC filters in accordance with the present disclosure, however, the refractive indices of the bus-waveguide and grating element can be independently adjusted; thereby enabling reflections to be tuned away from the wavelength range where signals reside and/or to avoid affecting sensitive upstream components. It should be noted that this can be done while largely maintaining the characteristic and spectral location of the optimized stopband.

In addition, prior-art contra-DC filters have increased coupling strength only in their mirror regions and use their taper regions only to reduce loss as the mode transitions from the grating to the regular waveguide geometry. In contrast, contra-DC filters in accordance with the present disclosure exhibit a long, weak interaction as soon as the beginning of their taper regions. By virtue of the simultaneous gradual increase in coupling and slow transition of the mode/geometry, suppression of sidelobes and filter roll-off behavior is substantially improved as compared to prior-art contra-DC filters.

Furthermore, the inclusion of a grating waveguide through the entire length of a grating element enables a wider stopband, while retaining symmetric behavior of the sidelobe resonances. This is difficult to achieve with the on-off gratings used in prior-art contra-DC filters. Asymmetry in the red- and blue-sidelobe fringes becomes more prominent as a taper region becomes longer. Since most embodiments in accordance with the present disclosure have long taper regions, this symmetric sidelobe behavior becomes an important aspect of such filters.

In some situations where a strong grating is required (i.e. width of grating teeth>>width of core waveguide), it is not feasible to attain phase-matching width without altering the width of the grating waveguide included in a grating element. As a result, in some embodiments, the width of a grating waveguide is non-uniform throughout at least a taper region of a grating element.

Figure 4:
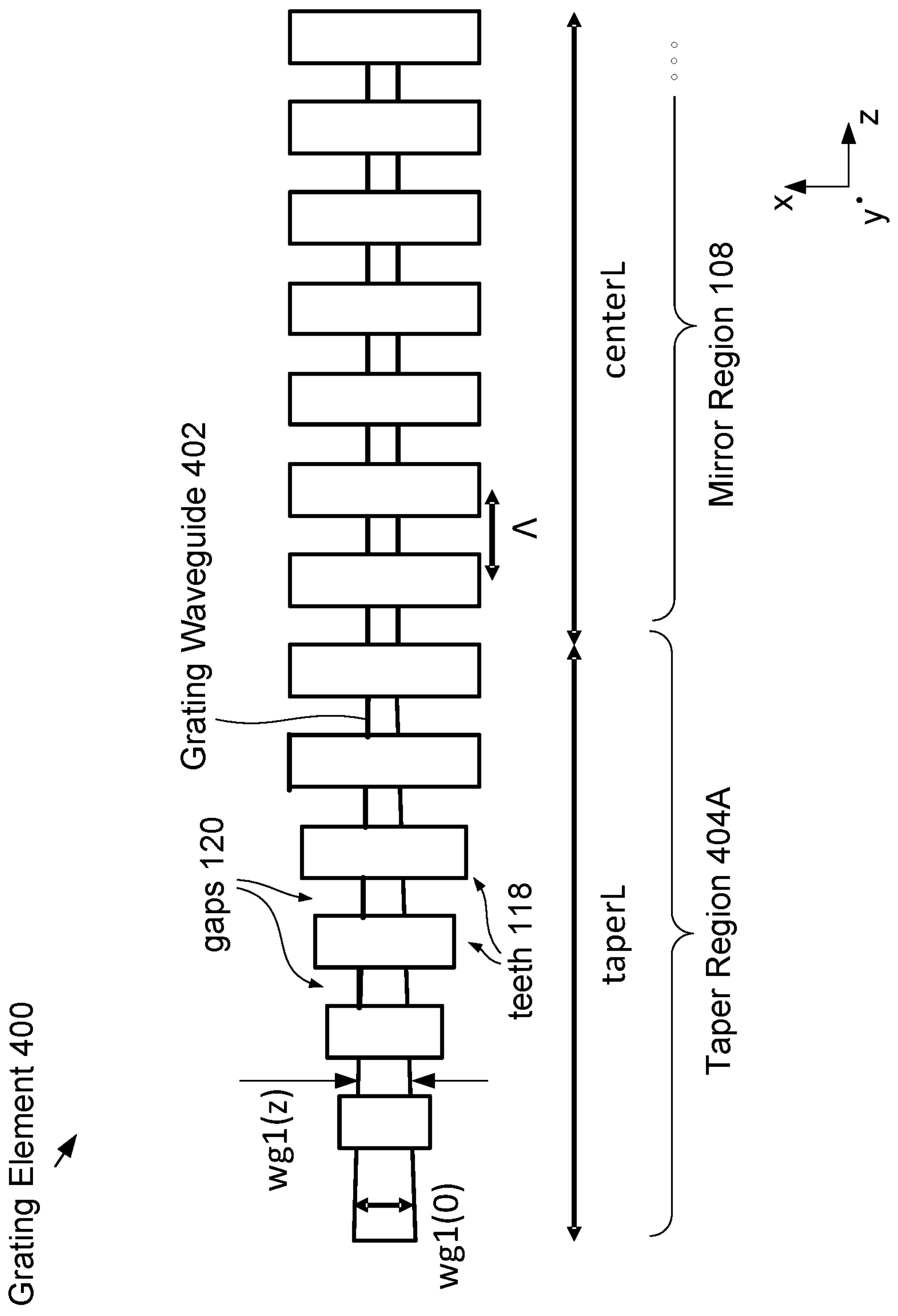
FIG. 4 depicts a schematic drawing of a plan view of an alternative grating element for a contra-DC filter in accordance with the present disclosure.

FIG. 4 depicts a schematic drawing of a plan view of an alternative grating element for a contra-DC filter in accordance with the present disclosure.

Grating element 400 is analogous to grating element 104; however, grating element 400 includes grating waveguide 402, which has a non-uniform width wg1($z$) along the length of taper region 404A.

In the depicted example, grating waveguide 402 is configured such that its width, wg1($z$), in taper region 404A has a functional profile that is substantially the same as the functional profile of grating teeth 118. The transition of the grating waveguide is designed to be adiabatic, similar to the taper region of the grating teeth. This additional degree of freedom allows for more flexibility in the design process, and can facilitate the phase-matching requirement mentioned above.

As will be appreciated by one skilled in the art, after reading this Specification, grating element 400 includes a second taper region (not shown) which is symmetrically located on the opposite side of mirror region 108.

It should be further noted that a contra-directional filter architecture in accordance with the present disclosure is not limited to single-device-layer process technologies. For example, if a layer stack includes multiple high index device layers in close proximity, these device layers can be utilized to implement each individual element of the filter on a different layer. Such an approach can ease the constraint of critical dimensions associated with standard lithography processes.

The gap between the grating element and the bus waveguide can then be subsequently defined using the hypotenuse of a triangle comprising the horizontal (Δx) and vertical (Δy) displacements between the two elements. Given that (Δy) can be very small and well controlled, and that the proximity of the filter features in the strong coupling region is then distributed to two separate layers (and therefore separate lithographic steps), the filter design process is further simplified, since no aspect-ratio-dependent fabrication issues must be accounted for in the high feature density interaction length IL section.

It is to be understood that the disclosure teaches just some examples of the illustrative embodiment and that many variations of the invention can easily be devised by those skilled in the art after reading this disclosure and that the scope of the present invention is to be determined by the following claims.

What is claimed is:

1. A contra-directional coupler (contra-DC) filter disposed on a substrate, the contra-DC filter comprising:

a bus waveguide having a first core comprising silicon nitride; and a grating element that is spatially separate from the bus waveguide and includes a grating waveguide having a second core and a first plurality of teeth that is optically coupled with the grating waveguide, the second core and the teeth of the first plurality thereof comprising silicon nitride, and wherein the grating element has a first length and the grating waveguide extends along the entire first length, the grating waveguide having a uniform width along the entire first length;

wherein the bus waveguide and grating element are configured to define first and second taper regions and a coupling region located between the first and second taper regions, the coupling region being a strongly coupled region for a first light signal, the grating waveguide being included in each of the first and second taper regions and the coupling region, wherein widths of the teeth in the first taper region vary according to position along the first taper region and widths of the teeth in the second taper region vary according to position along the second taper region;

wherein the first taper region includes a first adiabatic directional coupler for adiabatically transitioning the first light signal between a first weak coupling region and the coupling region; and wherein the second taper region includes a second adiabatic directional coupler for adiabatically transitioning a second light signal between the coupling region and a second weak coupling region, the second light signal including at least a first portion of the first light signal.

2. The contra-DC filter of claim 1 wherein the grating waveguide includes a drop port, and wherein the coupling region is configured to redirect a third light signal to the drop port, the third light signal including at least a second portion of the first light signal.

3. The contra-DC filter of claim 2 wherein the third light signal includes a single wavelength signal.

4. The contra-DC filter of claim 2 wherein the third light signal includes a wavelength channel that comprises a plurality of wavelength signals.

5. The contra-DC filter of claim 4 wherein the wavelength channel is aligned with the standard CDWM ITU grid, and wherein the plurality of wavelength signals is aligned with the standard DWDM ITU grid.

6. The contra-DC filter of claim 1 wherein the first core, the second core, and the teeth of the first plurality thereof consist of silicon nitride.

7. The contra-DC filter of claim 1 wherein the first plurality of teeth includes a first series of teeth and a second series of teeth, each tooth of the first and second series of teeth having a width that depends on its position within its respective series, and wherein the first taper region includes the first series of teeth and the second taper region includes the second series of teeth.

8. The contra-DC filter of claim 1 wherein the contra-DC filter is configured for operation in a wavelength range that includes wavelengths from approximately 1260 nm to approximately 1360 nm.

9. The contra-DC filter of claim 1 wherein coupling region includes a photonic crystal.

10. The contra-DC filter of claim 1 wherein the first core has a first width at the input port and a second width at the coupling region, and wherein the first width is larger than the second width.

11. A contra-directional coupler (contra-DC) filter disposed on a substrate, the contra-DC filter comprising:

a bus waveguide having a first core, the bus waveguide including (a) an input port for receiving a first light signal comprising a first plurality of wavelength signals and (b) an output port for providing a second light signal that includes at least one wavelength signal of the first plurality thereof; and a grating element that is spatially separate from the bus waveguide and comprises a first plurality of teeth and a grating waveguide having a second core, wherein the grating waveguide includes a drop port for providing a third light signal that includes at least one wavelength signal of the first plurality thereof, and wherein the grating element has a first length and the grating waveguide extends along the entire first length, the grating waveguide having a uniform width along the entire first length;

wherein each of the first and second cores and the teeth of the first plurality thereof comprises silicon nitride; and wherein the bus waveguide and grating element are arranged such that, for the first plurality of wavelength signals, they define:

(i) a strongly coupled region, the strongly coupled region defining a coupling region that includes a first portion of the bus waveguide and a first portion of the grating element, wherein the coupling region is configured to redirect the third light signal to the drop port;

(ii) a first taper region configured to adiabatically transition between the strongly coupled region and a first weakly coupled region that is outside a footprint of the contra-DC filter; and (iii) a second taper region configured to adiabatically transition between the strongly coupled region and a second weakly coupled region that is outside the footprint, wherein widths of the teeth in the first taper region vary according to position along the first taper region and widths of the teeth in the second taper region vary according to position along the second taper region.

12. The contra-DC filter of claim 11 wherein the first and second taper regions are configured to mitigate the generation of sidelobes of the first light signal.

13. The contra-DC filter of claim 11 wherein the third light signal includes a single wavelength signal.

14. The contra-DC filter of claim 11 wherein the third light signal includes a wavelength channel that comprises a plurality of wavelength signals.

15. The contra-DC filter of claim 14 wherein the wavelength channel is aligned with the standard CDWM ITU grid, and wherein the plurality of wavelength signals is aligned with the standard DWDM ITU grid.

16. The contra-DC filter of claim 11 wherein the first plurality of teeth includes a first series of teeth and a second series of teeth, each tooth of the first and second series of teeth having a width that depends on its position within its respective series, and wherein the first taper region includes the first series of teeth and the second taper region includes the second series of teeth.

17. The contra-DC filter of claim 11 wherein the contra-DC filter is configured for operation in a wavelength range that includes wavelengths from approximately 1260 nm to approximately 1360 nm.

18. A method for dropping at least one wavelength signal from a first light signal that includes a first plurality of wavelength signals, the method comprising:

providing a contra-DC filter disposed on a substrate, the contra-DC filter including: (i) a bus waveguide having a first core, the bus waveguide including an input port and an output port; and (ii) a grating element that is spatially separate from the bus waveguide and includes a grating waveguide having a second core and a first plurality of teeth that is optically coupled with the grating waveguide, the second core including a drop port;

wherein the first core, the second core, and the teeth of the first plurality thereof comprise silicon nitride;

wherein the bus waveguide and grating element collectively define first and second taper regions and a coupling region located between the first and second taper regions; and wherein the grating element has a first length and the grating waveguide extends along the entire first length, the grating waveguide having a uniform width along the entire first length, wherein widths of the teeth in the first taper region vary according to position along the first taper region and widths of the teeth in the second taper region vary according to position along the second taper region;

adiabatically transitioning the first light signal from a first weakly coupled region at the input port to a strongly coupled region at the coupling region;

at the coupling region, distributing the first light signal into second and third light signals, each of the second and third light signals including at least one wavelength signal of the first plurality thereof;

adiabatically transitioning the second light signal from the strongly coupled region to a second weakly coupled region at the output port and providing the second light signal at the output port; and adiabatically transitioning the third light signal from the strongly coupled region to the first weakly coupled region and providing the third light signal at the drop port.

19. The method of claim 18 further comprising providing the contra-DC filter such that the first and second taper regions mitigate the generation of sidelobes of the first light signal.

20. The method of claim 18 further comprising distributing the first light signal into the second and third light signals such that the third light signal includes a single wavelength signal.

21. The method of claim 18 further comprising distributing the first light signal into the second and third light signals such that the third light signal includes a wavelength channel that comprises a plurality of wavelength signals.

22. The method of claim 21 further comprising distributing the first light signal into the second and third light signals such that the wavelength channel is aligned with the standard CDWM ITU grid and the plurality of wavelength signals is aligned with the standard DWDM ITU grid.

23. The method of claim 18 further comprising providing the contra-DC filter such that the first plurality of teeth includes a first series of teeth and a second series of teeth, each tooth of the first and second series of teeth having a width that depends on its position within its respective series, and wherein the first taper region includes the first series of teeth and the second taper region includes the second series of teeth.

24. The method of claim 18 further comprising providing the first light signal such that it includes wavelengths from approximately 1260 nm to approximately 1360 nm.

* * * * *